April 4, 1950     A. B. BOLENDER     2,503,025
TORQUE CONVERTER
Filed Jan. 9, 1946
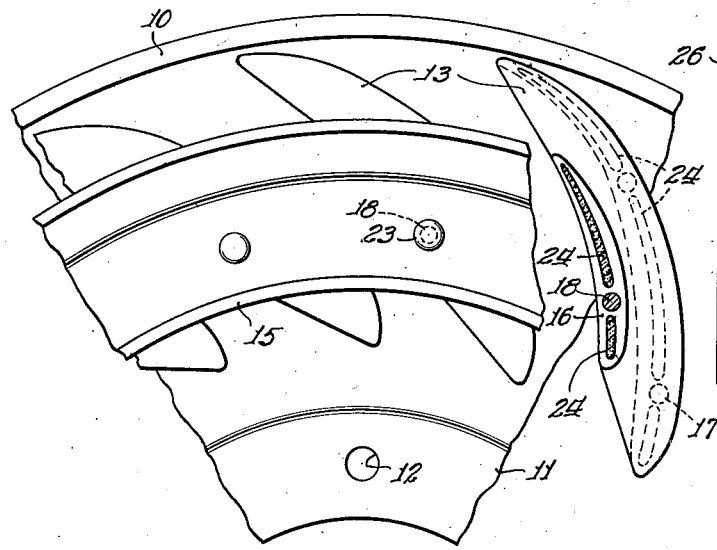
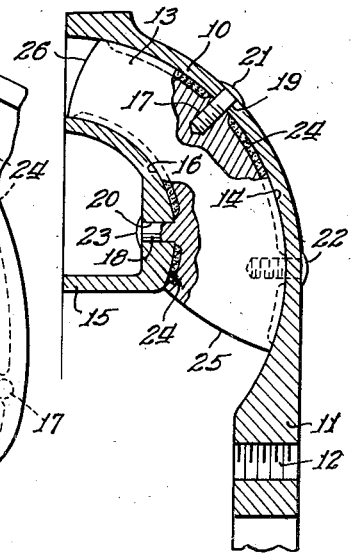
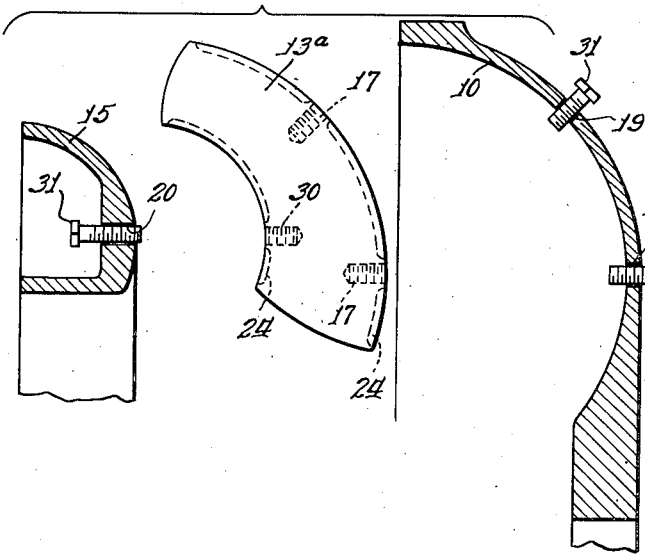
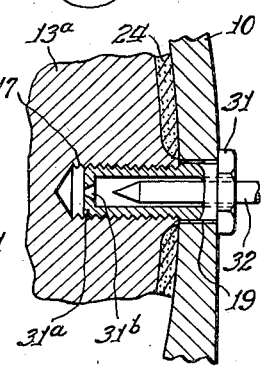
Inventor:
Augustus B. Bolender Patented Apr. 4, 1950

2,503,025

UNITED STATES PATENT OFFICE 2,503,025

TORQUE CONVERTER

Augustus B. Bolender, Muncie, Ind., assignor to Borg-Warner Corporation, Chicago, Ill., a corporation of Illinois Application January 9, 1946, Serial No. 640,011

16 Claims. (Cl. 103—115)

My invention relates to hydrodynamic coupling devices and more particularly to such coupling devices which function to multiply the torque between an input and an output shaft.

Hydrodynamic coupling devices generally comprise a plurality of vaned elements including a driving element and a driven element, the drive between which is through a body of liquid. The vanes of these elements impart energy to and receive energy from the body of liquid. A fluid coupling which is not intended to multiply torque generally includes only two such elements while a hydrodynamic torque converter for multiplying torque includes at least three vaned elements, a stator element which has a reaction force impressed thereon by the fluid and is held from rotation being the third element. Such hydrodynamic torque converters are shown, for example, in Schneider et al. Patent No. 2,306,758 and Schneider et al. Patent No. 2,333,680.

Considerable difficulty has been experienced in the past in assembly the hydrodynamic coupling devices and in particular the devices of the torque converting type. The driving and the driven elements of the non-torque converting type of coupling comprise vanes which are generally flat pieces of metal and which are attached to hollow annular casings. The vanes which are fixed within hollow annular casings to form the elements of a torque converting hydrodynamic device generally are curved, however, and are of substantial thickness and differ in thickness throughout their length and breadth. This being so, the vanes in the former type of coupling are more easily attached to the annular casings of the coupling than are the vanes in the latter type of coupling. The vanes in a torque converting hydrodynamic coupling device overhang and overlap the casings to which the vanes are fixed, and for this reason the vaned elements of the torque converter cannot easily be cast with the vanes integrally connected therewith, and the vanes are thus generally made separate from the casings to which they are to be attached, and attachment is made later.

With torque converting hydrodynamic couplings including blades mechanically attached to casings therefor, it has been found that it is very difficult to manufacture the blades and casings therefor to such precision that fluid does not pass between the blades and the casings, which fluid action reduces the efficiency of the device. It is accordingly an object of my invention to provide an improved arrangement and method for sealing or cementing the blades to the casings to prevent such an escapement of fluid between the blades and casings.

It is another object of the invention to provide an improved arrangement for fixing the blades to the casings and in particular to provide an improved screw arrangement for so fixing the blades. It is contemplated that by means of the improved arrangement, screws after once being put into position for fixing the blades and casings together may be locked in place by a deformation of the screws.

The invention consists of the novel constructions, arrangements, devices, processes and methods to be hereinafter described and claimed for carrying out the above stated objects and such other objects as will appear from the following description of certain preferred embodiments of the invention and methods for making the same, illustrated in the accompanying drawing, wherein:

Fig. 1 is a cross-sectional view of a portion of an impeller or driving element of a hydrodynamic torque converter embodying the principles of the invention;

Fig. 2 is an elevational view of the impeller as seen from the left in Fig. 1 or from the inner side of the impeller, with certain portions of the impeller being cut away to show certain internal constructions thereof;

Fig. 3 is a sectional view similar to Fig. 1 but with the parts of the impeller disassembled and with a modified construction being illustrated for fixing together the inner core ring and the vanes as will be hereinafter described; and Fig. 4 is a sectional view on an enlarged scale through the outer casing and a vane of Fig. 3 illustrating the arrangement and method for fixing the vane with respect to the casing.

Like characters of reference designate like parts in the several views.

Referring now to Figs. 1 and 2 of the drawing, the illustrated impeller element may be seen to comprise an outer casing member 10, which is provided with a hub portion 11 having holes 12 therethrough for attachment to a suitable shaft hub (not shown). The casing member 10 has a plurality of vanes 13 disposed in equally spaced relation therein, and the vanes are in contact with the casing member 10 on edges 14 thereof. An inner core 15 is disposed within and spaced from the casing member 10, and the core is in contact with edges 16 of the vanes which are opposite the edges 14.

It will be understood that the casing member 10 and the core 15 are both annular and are complete rings although only portions of the casing member and core are illustrated in the drawing. The vanes 13 are equally spaced and extend around the casing member and core ring. It will be noted that the vanes 13 are curved and have a varying and substantial thickness, and the vanes are of such form that the illustrated hydrodynamic coupling element is adapted to constitute an impeller in a hydrodynamic torque converter such as is, for example, shown in the two Schneider patents hereinbefore mentioned. It will be understood that the illustrated impeller element is adapted to be used in connection with a vaned driven element and a vaned stator element, which constitute the three elements ordinarily found in a hydrodynamic torque converter, with the impeller element functioning to impart energy to a body of liquid in the torque converter, the driven or runner element receiving energy from the liquid and the stator element being held from rotation and functioning as a reaction element to change the direction of flow of the liquid such that the coupling functions to multiply the torque.

The vanes 13 are provided with threaded holes 17 in their outer edges 14 and are provided with integral pins 18 on their inner edges 16. The casing member 10 is provided with openings 19 therein corresponding to the holes 17 in the vanes 13 and the core ring 15 is provided with openings 20 corresponding to the pins 18. Screws 21 and 22 are utilized for fixing the vanes 13 to the casing member 10, the screws extending through the openings 19 and into the threaded holes 17 in the vanes, as shown. The pins 18 extend through the openings 20 in the core ring 15 and are riveted over to form heads 23 to fix the core ring 15 with respect to the vanes and casing member.

The vanes 13 are provided with channel-like recesses 24 in both their outer edges 14 and in their inner edges 16. These recesses in the outer edges of the vanes extend between the threaded openings 17 and from the threaded openings to the edges 25 and 26 of the vanes. The recesses in the inner edges 16 extend from the pins 18 to the edges 25 and 26 of the vanes, as shown. These recesses contain a material for sealing the vanes with respect to the casing member 10 and core ring 15 to prevent the flow of any fluid between the vanes and the casing member and core ring due to spaces between these parts which are caused by the tolerances which must be allowed in the manufacture of such parts. The sealing agent may be any suitable material such as foundry cement or a phenolic resin, for example, and a metal may also be used as the sealing agent. Such a metal may be ordinary solder which, in addition to sealing the vanes with respect to the casing member and core ring, also would act to fix the vanes with respect to the casing member and core ring and would augment the action of the screws 21 and 22 and rivets 18.

Although I have illustrated, in Figs. 1 and 2, screws 21 and 22 for fixing the vanes 13 with respect to the casing member 10 and rivets 18 integral with the vanes 13 for fixing the vanes with respect to the core ring 15, it will be understood that screws may also be used to fix the core ring to the vanes in lieu of the rivets 18 or rivets may be used in lieu of the screws 21 and 22 to fix the vanes in the casing member 10. In Fig. 3, I have illustrated an embodiment of the invention in which screws, to the exclusion of rivets, are used to fix the vanes with respect to the casing member and core ring.

In Figs. 3 and 4 the same casing member 10 and core ring 15 are illustrated as in Figs. 1 and 2; however, vanes 13a which are provided with threaded holes 30 in lieu of the integral pins 18 are used in lieu of the vanes 13. The vanes 13a are fixed with respect to the casing member 10 and core ring 15 by means of screws 31 which extend through the openings 19 in the casing member and into the threaded holes 17 in the vanes and extend through the openings 20 in the core ring 15 and into the threaded holes 30 in the vanes 13a. The screws 31 are hollow and may be deformed on their inner ends in order to lock the screws in place, as will be hereinafter described. The vanes 13a are sealed with respect to the casing member 10 and core ring 15 by means of sealing material in the channels 24 in the vane edges in the same manner as are the vanes 13.

The torque converter impeller elements are assembled by first filling the channels 24 in the vane edges 14 with the sealing material and then putting the vanes into the casing member 10. The vanes are then fixed within the casing member 10 by screwing in the screws 21 and 22 or the screws 31. The channels 24 in the inner edges 16 of the vanes are then filled with sealing material and the core ring 15 is put into place on the vanes. The core ring 15 is fixed with respect to the vanes by either forming heads on the pins 18 or putting in the screws 31 into the threaded holes 30 of the vanes 13a, depending on the form of vanes used. If such a sealing material as foundry cement is used, any excess cement is wiped away from the joints between the vanes and casing member and core, while if a sealing material such as solder is used, the parts are heated to melt the solder and cause it to make sealed joints between the vanes and casing member and core ring. In the event the expansible screws 31 are used, the screws after having been put into place are expanded to lock the screws in the vanes. This may be done by utilizing a punch 32 (see Fig. 4) and driving it into the inner end 31a of each of the screws 31. The screws 31 are preferably provided with central openings 31b in their inner ends which are smaller than the diameter of the punch 32 to facilitate such an expansion of the screws on their inner ends.

It is to be noted that where the screws 21 or 22 are employed and the sealing material is of a non-metallic nature as, for example, the foundry cement or the phenolic resin mentioned above, these screws operate to firmly draw the edges of the vanes toward the inner surface of the casing 10 to compress the sealing material within the recesses or channels 24 and against the inner surface of the casing 10, thus not only maintaining the sealing material within a substantially closed region in the vanes against dislodgement but also serving to compress the sealing material against the inner surface of the casing 10 and provide an effective seal for purposes set forth above. Obviously, where a sealing material of this nature is employed in a like manner between the edges of the vanes and the core member or ring 15, the same sealing effect is attained.

My invention advantageously provides an improved arrangement and method for sealing torque converter blades to both the inner and outer casings to which they are attached. The grooves 24 having cement therein assure that a good seal will be made between the vanes and the adjacent parts and act to anchor the cement with respect to the vanes. The locking screws 31 advantageously function to lock the vanes with respect to the casing member and core so that vibration may not loosen the connection between these parts.

I wish it to be understood that my invention is not to be limited to the specific constructions of hydrodynamic couplings or to the specific methods for making the same which are shown and described, except only insofar as the claims may be so limited, as it will be apparent to those skilled in the art that changes may be made without departing from the principles of the invention. In particular, I wish it to be understood that the invention is not to be limited to torque converting couplings to the exclusion of non-torque converting couplings, unless the claims are so limited. Furthermore, I wish it to be understood that, although the invention is illustrated in connection with an impeller element of a hydrodynamic coupling device, the same arrangement and method for sealing the blades and fixing them in place may be used with the other vaned elements of a hydrodynamic coupling, and I do not intend to limit my invention to any particular element of a hydrodynamic coupling, unless the claims are so limited.

I claim:

1. In a hydrodynamic coupling element, the combination of a casing member and a vane fitting to said member, said casing member and vane having abutting face portions, one of said face portions being provided with a hollow therein, and sealing material in said hollow for sealing said vane with respect to said casing member.

2. In a hydrodynamic coupling element, the combination of a hollow casing member, a plurality of spaced vanes within said member, said vanes having edges in contact with and abutting the inner surface of said casing member, said edges of the vanes being provided with hollows therein, and sealing material in said hollows for sealing the vanes with respect to said casing member.

3. In a hydrodynamic coupling element, the combination of a hollow casing member, a plurality of spaced vanes within said member, said vanes having edges thereof in contact with and abutting the inner surface of said casing member, said edges of said vanes being channelled, and sealing material in said channels for sealing said vanes with respect to said casing member.

4. In a hydrodynamic coupling element, the combination of a hollow casing member, a plurality of spaced vanes within said member, said vanes having edges thereof abutting and in contact with the inner surface of said casing member, said vanes on their said edges being channelled, sealing material in said channels for sealing the vanes with respect to said casing member, and pins passing through said casing member to said vanes for fixing the vanes within the casing member.

5. In a hydrodynamic coupling element, the combination of a hollow casing member, a plurality of spaced vanes within said member, said vanes having edges thereof abutting and in contact with the inner surface of said casing member, pins extending through said casing member to said vanes for fixing the vanes to the casing member, said vanes on their said edges being channelled between said pins and also between the pins and the ends of the vanes, and sealing material in said channels for sealing the vanes with respect to said casing member.

6. In a hydrodynamic coupling element, the combination of a hollow casing member, a core within said casing member and spaced therefrom, a plurality of spaced vanes within said casing member and between said core and member, said vanes having abutting face portions with said casing member and core, one of said face portions for each of said vanes between the vane and said core and one of said face portions for each of said vanes between the vane and casing member each being provided with a hollow therein, and sealing material in said hollows for sealing the vanes with respect to said casing member and core.

7. In a hydrodynamic coupling element, the combination of a hollow casing member, a core within and spaced from said casing member, a plurality of spaced vanes within said member and extending between said core and member, said vanes having edges thereof abutting and in contact with said core and casing member, said edges of said vanes being channelled, and sealing material in said channels for sealing the vanes with respect to said casing member.

8. In a hydrodynamic coupling element, the combination of a hollow casing member, a core within said casing member and spaced therefrom, a plurality of spaced vanes within said member and extending between said core and member, said vanes having edges thereof abutting and in contact with said core and member, pins passing through said casing member and core to said vanes for fixing the vanes with respect to said casing member and core, said vanes on their edges being channelled between adjacent ones of said pins and between the pins and the ends of the vanes, and sealing material in said channels for sealing the vanes with respect to said casing member and core.

9. In a hydrodynamic coupling element, the combination of a casing member, a plurality of spaced vanes having portions of the edges thereof in contact with said casing member, sealing means between other portions of the edges of said vanes and said casing member for sealing the vanes with respect to the casing member, and screws extending through said casing member and into said vanes for fixing the vanes with respect to the casing member, said screws being deformed from their original shape at the inner portions thereof for locking the screws in the vanes.

10. In a hydrodynamic coupling element, the combination of a hollow casing member, a plurality of spaced vanes within said member, a core within said member, said vanes extending between said casing member and core and having portions of edges thereof in contact with the casing member and core, sealing means between other portions of the edges of said vanes and said casing member and said core for sealing said vanes with respect to said casing and said core, and screws extending through said casing member and core and into said vanes for fixing the vanes with respect to the casing member and core, said screws being deformed from their original shape on their inner ends for locking the screws in said vanes.

11. In a hydrodynamic coupling element, the combination of a hollow casing member, a plurality of spaced vanes within said member, a core within said member and spaced therefrom, said vanes extending between said member and core and having portions of edges thereof in contact with said member and core, sealing means between other portions of the edges of said vanes and said casing member and said core for sealing said vanes with respect to said casing and said core, and screws extending through said casing member and core and into said vanes for fixing the vanes to the casing member and core, said screws being deformed at their inner ends from their original shape in which they may be screwed into said vanes whereby for locking the screws in said vanes, said screws being hollow for rendering the screws adaptable to such deformation after being screwed into said vanes.

12. In a hydrodynamic coupling element, the combination of a casing member and a vane fitting to said member, said casing member and vane having abutting face portions, one of said face portions being provided with a recess therein, a sealing material substantially filling said recess and bearing against the other face portion in sealing relationship for sealing said vane with respect to said casing member, and means for retaining said vane and casing member in assembled relationship to confine said sealing material in position within said recess.

13. In a hydrodynamic coupling element, the combination of a hollow casing member, a plurality of spaced vanes within said member, said vanes having edges in contact with and abutting the inner surface of said casing member, said edges of the vanes being provided with hollows therein, sealing material in said hollows for sealing the vanes with respect to said casing member, and means for retaining said vane and casing member in assembled relationship.

14. In a hydrodynamic coupling element, the combination of a vane-supporting member, a plurality of spaced vanes within said member, each vane having an edge thereof in opposed relation to the inner surface of said casing member, sealing means between said vane edges and the inner surface of said member for sealing said vanes with respect to said member, and means for retaining said member and vanes in assembled relationship and for positively drawing the member and vanes together to compress the sealing means therebetween.

15. In a hydrodynamic coupling element, the combination of a vane-supporting member, a plurality of spaced vanes on said member, said vanes each having an edge with a portion thereof abutting and in contact with a surface of said supporting member, a sealing material between another and medial portion of the edge of each vane and the inner surface of said supporting member for sealing the vanes with respect to the supporting member, and anchoring screws extending through said casing member and into the vanes for fixing the vanes to the casing member, and for compressing and confining said sealing material between the edges of the vanes and the surface of said supporting member.

16. In a hydrodynamic coupling element, a combination of a hollow vane-supporting member, a plurality of vanes within said member, said vanes having edges in contact with and abutting a surface of said member, the edges of the vanes being provided with hollow recesses therein, a sealing material substantially filling said recesses and bearing against the surface of said member for sealing the vanes with respect to the member, a hollow, tubular clamping element projecting through said member and extending into and having threaded engagement with each vane, said member being expanded radially into frictional engagement with the metal of each vane to prevent removal of the clamping element, and serving to draw the vane edges into tight engagement with the surface of the member to compress the sealing material within said recesses and confine the same therein.

AUGUSTUS B. BOLENDER.

REFERENCES CITED

The following references are of record in the file of this patent:

UNITED STATES PATENTS

| Number | Name | Date |
| --- | --- | --- |
| 577,737 | Flaherty | Feb. 23, 1897 |
| 978,753 | Hurst | Dec. 13, 1910 |
| 1,191,151 | Brush | July 18, 1916 |
| 1,694,481 | Moody | Dec. 11, 1928 |
| 2,050,728 | Ost | Aug. 11, 1936 |
| 2,216,747 | Klimek | Oct. 8, 1940 |
| 2,278,953 | Stockham | Apr. 7, 1942 |
| 2,351,517 | Jandasek | June 13, 1944 |
| 2,370,327 | Rosan | Feb. 27, 1945 |
| 2,371,847 | Saunders | Mar. 20, 1945 |
| 2,387,722 | Dodge | Oct. 30, 1945 |
| 2,401,206 | Rijswijk | May 28, 1946 |
| 2,402,204 | Phelan et al. | June 18, 1946 |

FOREIGN PATENTS

| Number | Country | Date |
| --- | --- | --- |
| 4,939 | Great Britain | Apr. 16, 1903 |